May 7, 1946.  W. F. PITTMAN  2,399,889
BEARING
Filed Aug. 23, 1943
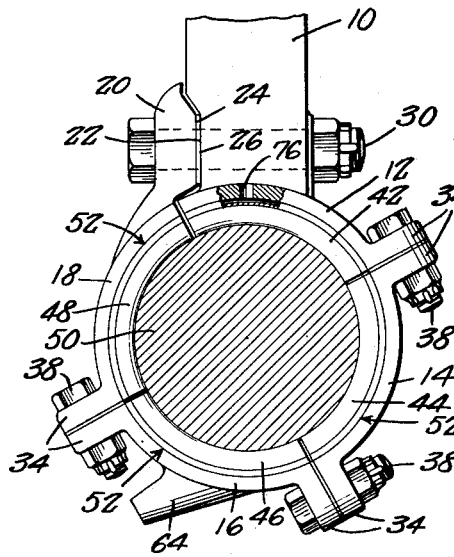
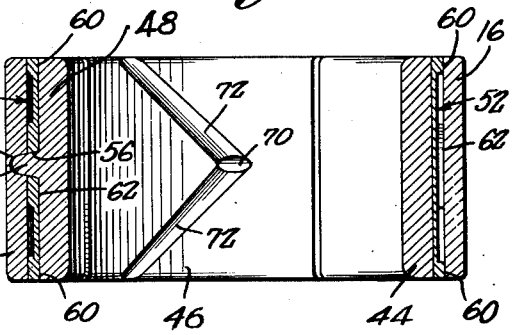
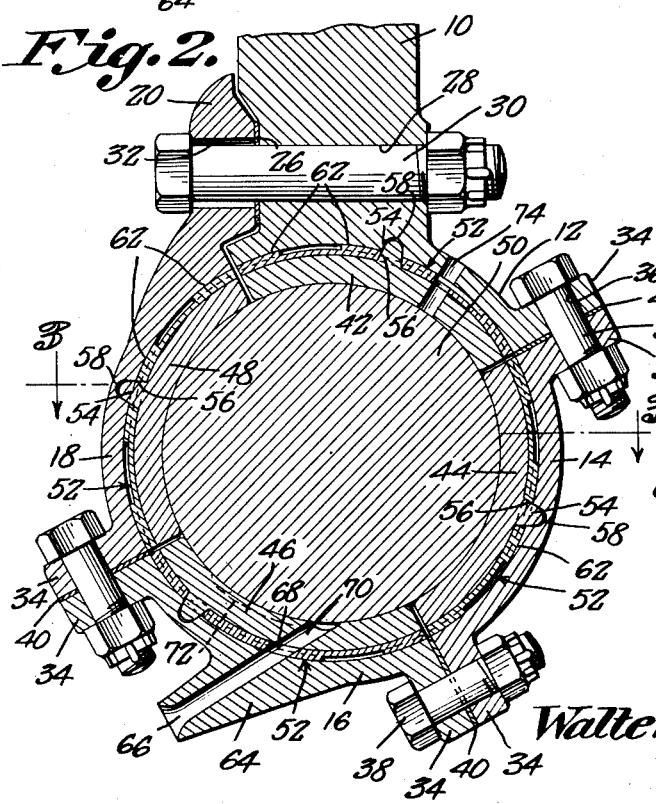
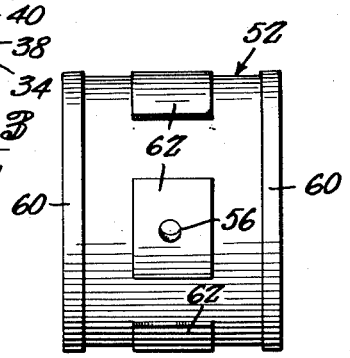
INVENTOR,
Walter F. Pittman
BY
Victor J. Evans & Co.
ATTORNEYS Patented May 7, 1946

2,399,889

UNITED STATES PATENT OFFICE 2,399,889

BEARING

Walter F. Pittman, Portsmouth, Va.

Application August 23, 1943, Serial No. 499,702

1 Claim. (Cl. 308—67)

My invention relates to bearings, particularly of the type employed in internal combustion engines for connecting the connecting rod with the crankpin, and has among its objects and advantages the provision of an improved segmental bearing so designed as to attain novel radial adjustment of the bearing segments with respect to the axis of the crankpin.

In the accompanying drawing:

Figure 1 is a view illustrating the bearing applied to a crankpin with a portion of the bearing broken away.

Figure 2 is an enlarged cross sectional view of the crankpin and the bearing.

Figure 3 is a sectional view taken along the line 3—3 of Figure 2 but with the crankpin removed, and Figure 4 is a face view of a bearing insert or cushioning segment.

In the embodiment of the invention selected for illustration, a fragment of the connecting rod is illustrated at 10, the connecting rod being provided with a segment 12 curving through an arc of substantially 90 degrees. Three cooperating segments 14, 16 and 18 are associated with the segment 12. The segment 18 is also curved throughout an arc of substantially 90 degrees and includes an extension 20 overlying one side of the connecting rod 10 adjacent the segment 12. A shallow recess 22 is provided in the connecting rod 10 and the extension 20 has a face 24 lying in the recess 22, with a shim 26 positioned between the bottom face of the recess 22 and the face 24. The segments 14 and 16 are also respectively curved through arcs of substantially 90 degrees.

A transverse opening 28 is provided in the connecting rod 10 for the reception of a bolt 30 extending through a bore 32 in the extension 20, so that the extension may be clamped firmly to the connecting rod. Lugs 34 are provided on the segments 12, 14, 16 and 18, which lugs are provided with openings 36 for the reception of bolts 38, and shims 40 are interposed between the grouped lugs so that all the segments may be clamped into a unitary structure through tightening of the bolts 38.

Inner segments 42, 44, 46 and 48 are interposed between the segments 12, 14, 16 and 18, respectively. All the inner segments have engagement with the crankpin 50, and cushioning segments 52 are interposed between the segments 12 through 18 and 42 through 48, respectively.

The cushioning segments 52 comprise soft metal and are restrained from displacement by lugs 54 on the segments 42 through 48 and extending through openings 56 in the cushioning segments. Recesses 58 are provided in the segments 12 through 18 for accommodating the lugs 54, the lugs fitting with sufficient looseness to permit the segments 42 through 48 to be shifted relatively to the segments 12 through 18 as when the bearing is being adjusted to the crankpin 50.

Figure 4 illustrates the outside face of one of the segments 52. All the segments are of the same general construction. Ribs 60 are located at the ends of the segment and have engagement with the convexed face of its respective outer segment. The concaved face of the segment has 100 per cent contact with the convexed side of its inner segment. Bodies 62 are provided on the segment, which bodies are of the same thickness as the ribs 60, with the end bodies each having a length equalling about half the length of the center cushioning body. The opening 56 passes through the central cushioning body.

The segment 16 is provided with an oil scoop 64 having a bore 66 arranged coaxially with the bore 68 in one of the cushioning segments and a bore 70 in the segment 46. These bores are arranged substantially tangentially of the crankpin 50 and communicate with diverging grooves 72 in the concaved face of the segment 46. The segments 12 and 42 and the associated cushioning segment 52 are provided with aligned outlet openings 74.

An opening 76 is provided in the segment 12 which communicates with the space between the cushioning segment and the segment 12. This permits oil to fill the spaces between the cushioning segments and the segments 12 through 18, respectively, to function as a cushioning medium.

All the segments are adjustable endwise through shifting of the segments 12 through 18, as by increasing or decreasing the shim thickness between the coacting lugs 34. This construction permits the bearing to be adjusted radially of the crankpin throughout its circumference to the end that the bearing may be accurately fitted to the crankpin.

Without further elaboration, the foregoing will so fully explain my invention, that others may, by applying current knowledge, readily adapt the same for use under various conditions of service.

I claim:

The combination with a cylindrical body carried by a connecting rod, of a bearing mounted in said cylindrical body, said bearing comprising a plurality of segmental units arranged end to end circumferentially of the cylindrical body and adjustable radially with respect to the axis of the cylindrical body for increasing or decreasing the diameter of the bearing through relative endwise movement of the segmental units, said segmental units comprising inner and outer segments, cushioning segments between the inner and outer segments, one of said outer segments being fixedly attached to said connecting rod, another of said outer segments being adjustably connected with said connecting rod, lugs on the other outer segments and bolts coacting with said lugs, said inner segments being adjustably keyed to the cushioning segments and the outer segments, said cushioning segments being shaped to provide an oil space extending circumferentially thereof, an inlet in one of said outer segments to feed oil to said space, and an oil scoop means for delivering oil to the cylindrical body.

WALTER F. PITTMAN.